July 24, 1951  L. E. CLARK ET AL  2,561,497
CINEMATOGRAPHIC APPARATUS
Filed June 5, 1946  3 Sheets-Sheet 1
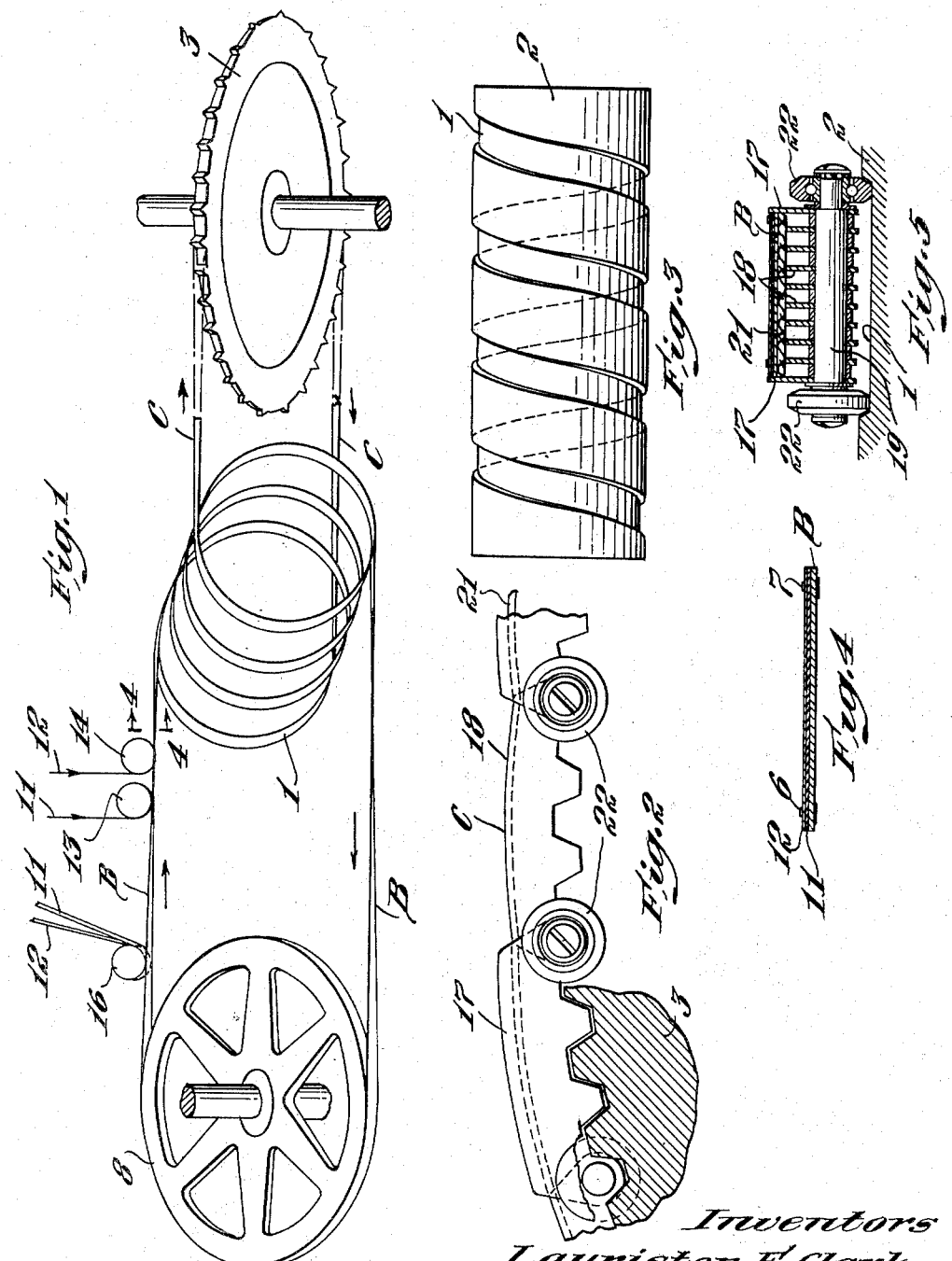
Inventors
Lauriston E. Clark
John M. Andreas
by Roberts, Cushman & Grover
Att'ys.

July 24, 1951  L. E. CLARK ET AL  2,561,497
CINEMATOGRAPHIC APPARATUS
Filed June 5, 1946  3 Sheets-Sheet 2

Inventors
Lauriston E. Clark
John M. Andreas
by Roberts, Cushman & Grover
att'ys.

Patented July 24, 1951

2,561,497

UNITED STATES PATENT OFFICE 2,561,497

CINEMATOGRAPHIC APPARATUS

Lauriston E. Clark, Los Angeles, and John M. Andreas, Pasadena, Calif., assignors to Technicolor Motion Picture Corporation, Hollywood, Calif., a corporation of Maine Application June 5, 1946, Serial No. 674,557

8 Claims. (Cl. 271—2.1)

1

In the art of cinematography it is often desirable to keep two films in accurate register with each other while traveling through a relatively long path. For example in printing a dye-absorptive blank film by imbibition of dye from a dye-soaked matrix film, it is customary to feed the two films into accurate registry with each other and thence through a path long enough to permit the dye to transfer from the matrix to the blank. Likewise in transferring a picture layer from one motion picture film to another it has been proposed to wet the films, feed them into accurate registry with each other and then, while they are in contact with each other, conduct them through a relatively long path to permit an emulsion layer to become loosened from one film and adhere to the other film, as disclosed for example in the Patent 2,415,442 of Gerald F. Rackett. Originally it was proposed to make these paths relatively straight but such machines occupy too much space. Various proposals have been made to reduce the required space, as for example by conducting the films back-and-forth over drums or rollers, but these proposals have not been satisfactory because they involve too much flexing of the films back-and-forth as they pass to and from each drum or roller.

Objects of the present invention are to produce a machine which is small and compact and in which the films travel in accurate registration with each other throughout a long path without flexing the films back and forth while traveling along the path and preferably without twisting the films.

In one aspect of the present invention the apparatus comprises an endless flexible carrier in combination with stationary guide means for guiding the carrier along an approximately spiral path so that the carrier is not subjected to substantial flexing back-and-forth while traversing the path, and means for feeding the carrier along an orbital path including the spiral path and also a return path which leaves the spiral path tangentially at one end and joins it tangentially at the other end. Preferably the film carrier comprises links pivotally interconnected like a sprocket chain and it has rollers or other antifriction means to minimize the snubbing action which occurs in drawing the carrier over the spiral guideway. In the preferred embodiment the film is guided to the carrier just after the carrier enters the spiral portion of its path and the film is guided away from the carrier just before the carrier leaves the spiral portion of the path. While the carrier may be constructed to support the films directly, preferably the films are first fed into accurate registration on a pin-belt and thence to the carrier with the pin-belt between the films and the carrier. Suitable belt constructions are disclosed in Patents 1,707,699 and 1,707,710. Like the carrier the pin-belt is preferably endless so as to travel in an orbital path including the spiral path and a return path. While the return paths of the carrier and pin-belt may be located on any two sides of the axis of the spiral path, including the same side, they are preferably located on opposite sides of the spiral axis. The preferred means for guiding the carrier and pin-belt along their return paths comprises two wheels, one for the carrier and one for the belt, each wheel being inclined to the axis of the spiral path and having its opposite sides tangentially aligned with the spiral path at the opposite ends of the spiral path. While the films may be fed to the belt after the belt has been superposed over the carrier at the beginning of the spiral path, it is more convenient to feed the films to the belt before the belt reaches the carrier. Likewise it is preferable to feed the films from the belt after the belt has left the carrier. Even though this involves some flexing of the films after they are applied to the belt and before they leave the belt, this flexing is not objectionable if confined to the beginning and end of the portion of the path where the films travel together.

In another aspect the invention involves an endless pin-belt or other flexible carrier in combination with means for guiding the carrier along an orbital path including two succeeding spiral portions disposed side by side so that the progression of the carrier lengthwise of the spiral axes is in approximately opposite direction in the two portions respectively, the axes being disposed substantially in the same plane but being inclined to each other in that plane so that the ends of the portions where the carrier crosses from one portion to the succeeding portion are in tangential alignment, whereby the carrier may feed from one portion to the other portion without substantial twisting. The orbital path of the carrier includes a plurality of curved portions in addition to the aforesaid spiral portions, the curved portions being arranged in tangential alignment with ends of the spiral portions and the axes of the curved portions being approximately parallel to the plane containing the axes of the spiral portions so that the carrier may feed from spiral portion to curved portion and vice versa without substantial twisting. The spiral portions are provided in one or more pairs and the axes of alternate spiral portions are inclined in equal degree and in opposite directions lengthwise of the row of spiral portions. In the preferred embodiment the guide means comprises two wheels for guiding the carrier in the curved portions of the orbital path other than the said spiral portions, the two wheels being disposed in the same plane with the spiral guideways intermediate the two wheels, the axes of the spiral guideways being disposed approximately in a plane perpendicular in the plane of the wheels and parallel to the axes of the wheels, and the axes of the spiral guideways being inclined to the plane of the wheels equally and alternately in opposite directions so that the ends of the spiral portions of the orbital path align tangentially with each other and with the wheels respectively, whereby the carrier may feed between the curved portions of the path without substantial twisting.

For the purpose of illustration typical embodiments of the invention are shown in the accompanying drawings in which Fig. 1 is a perspective view of one embodiment in which the spiral path is illustrated diagrammatically;

Fig. 2 is a side view of a portion of the chain carrier, showing a part of the sprocket wheel for driving the carrier;

Fig. 3 is a side view of the spiral guide;

Fig. 4 is a section on line 4—4 of Fig. 1;

Fig. 5 is a cross-section of the chain carrier, showing a part of the spiral drum;

Figure 6:
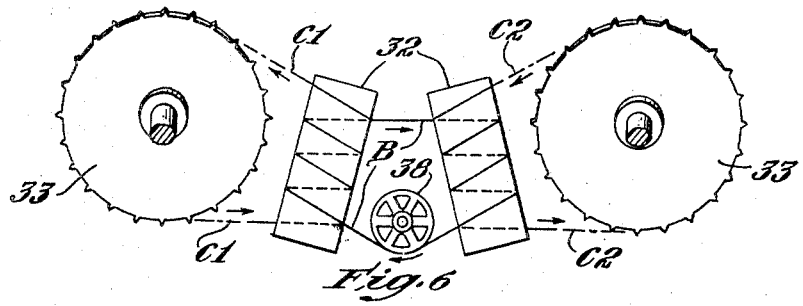
Fig. 6 is a diagrammatic plan view of a machine having two spiral paths.

In the particular embodiment of the invention shown in Figs. 1 to 5 the spiral guideway 1 is formed in the periphery of a cylinder 2, the spiral path being shown diagrammatically in Fig. 1 without including the cylinder 2. The carrier C is fed around the spiral path by means of a sprocket wheel 3 which is inclined to the axis of the spiral path so that its upper side aligns with the upper side of the spiral path at the near end of the path and its lower side aligns with the lower side of the spiral path at the far end of the path. Thus the carrier feeds tangentially from one end of the spiral, thence through 180° around the sprocket wheel and thence tangentially back to the other end of the spiral path.

As disclosed in the aforesaid Patents 1,707,699 and 1,707,710 the pin belt B comprises a ribbon of Monel metal or the like with two rows 6 and 7 of register pins mounted in the margins of the ribbon for engagement in the film sprocket holes. The belt B feeds over the carrier C on the upper side of the far end of the spiral guideway, at a point in the spiral approximately 180° beyond the location where the carrier feeds into the spiral; and the belt feeds away from the carrier at the lower side of the near end of the spiral, at a location approximately 180° in advance of the location where the carrier leaves the spiral. The belt B is guided in the return portion of its orbit by means of an inclined wheel 8 the opposite sides of which align with the opposite ends of the spiral path. Ordinarily it is not necessary to drive the wheel 8, the belt being propelled by the carrier. Films 11 and 12 are fed to the belt in superposition over rolls 13 and 14 and, after traversing the spiral portion of the belt path and most of its return portion, they are fed from the belt over a roll 16.

As shown in Figs. 2 and 5 the carrier comprises links 17 and 18 pivotally interconnected in spaced relationship by axles 19 carrying wheels 22 which run in the guideway 1. The side links 17 of alternate sections extend outwardly somewhat farther than the remaining links 18 to serve as guides. Laid over the links 18 between the side guide links 17 is a belt 21 of canvas or other suitable material. This distance between the guiding links 17 is slightly greater than the width of the belt B so that the belt B may seat on the canvas belt 21 between the upper margins of the guiding links. As shown in Fig. 2 the lower or inner edges of the links 17 and 18 are notched to mesh with the sprocket wheel 3.

Figure 7:
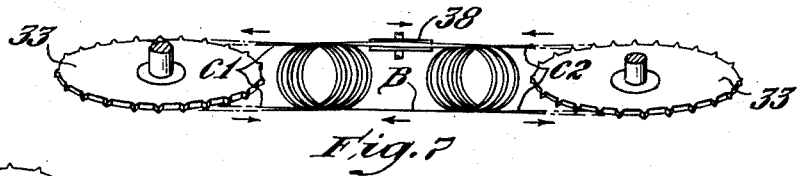
Fig. 7 is a diagrammatic side view of the same machine.

The modification shown in Figs. 6 and 7 is like that shown in Figs. 1 to 5 except in that it has two spiral guides 32 like the guide 2 in the first embodiment. The guides have their axes in the same plane but the axes are inclined relatively to each other in that plane so that the pin-belt B, in crossing from one guide to the other at the end of the guides nearest to each other, is not subjected to any twisting. At the other ends of the guides (the lower ends in Fig. 6 and the near ends in Fig. 7) the belt crosses from the right-hand guide to the left-hand guide over a pulley 38 corresponding to 8 of Fig. 1. In passing from guide to pulley and from pulley to guide the belt is subjected to some twisting. Interposed between the belt and the left-hand spiral guide is a carrier C1 like the carrier C of Figs. 1 to 5, a corresponding carrier C2 being provided for the right-hand spiral guide. These carriers are guided and propelled by sprocket wheels 33 corresponding to wheel 3 of Fig. 1. While the films may be fed to and from the pin-belt at any desired locations they are preferably fed to the belt after the belt leaves pulley 38 and from the belt just before the belt reaches pulley 38. Thus the belt is not subjected to any twisting while the films are traveling with it except that the beginning and end of the circuit. However the two films may be fed to and from the belt in the untwisted portion of the belt, the films being fed to the belt just before it enters the right-hand spiral and from the belt just after it leaves the left-hand spiral. Instead of having one pair of films traverse both spirals, two pairs of films may be passing through the machine at the same time, one pair being fed to the belt just before it enters one spiral and from the belt just after it leaves the spiral and the other pair of films being fed to the belt just before it enters the other spiral and from the belt just after it leaves the other spiral. This procedure is particularly suited to two-color photography.

Figure 8:
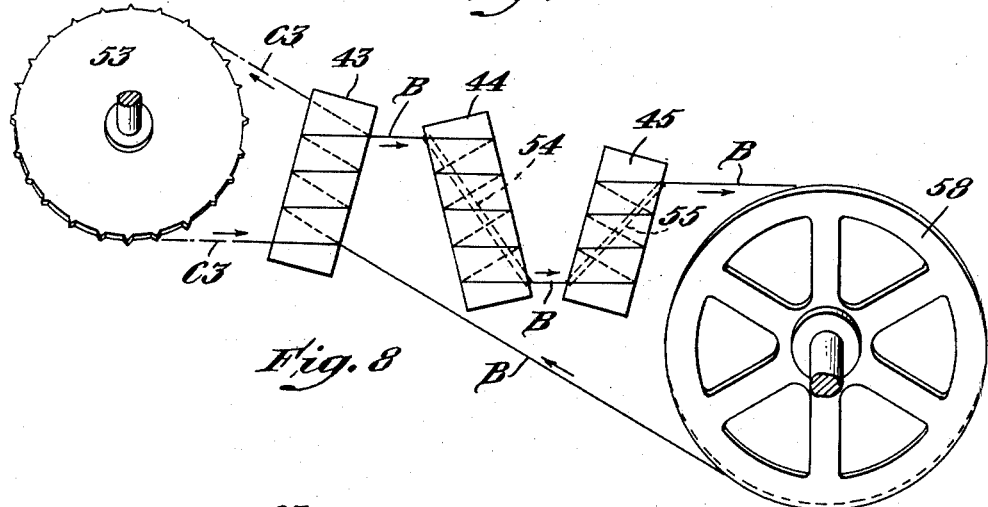
Fig. 8 is a diagrammatic plan view of a machine having three spiral paths.
Figure 9:
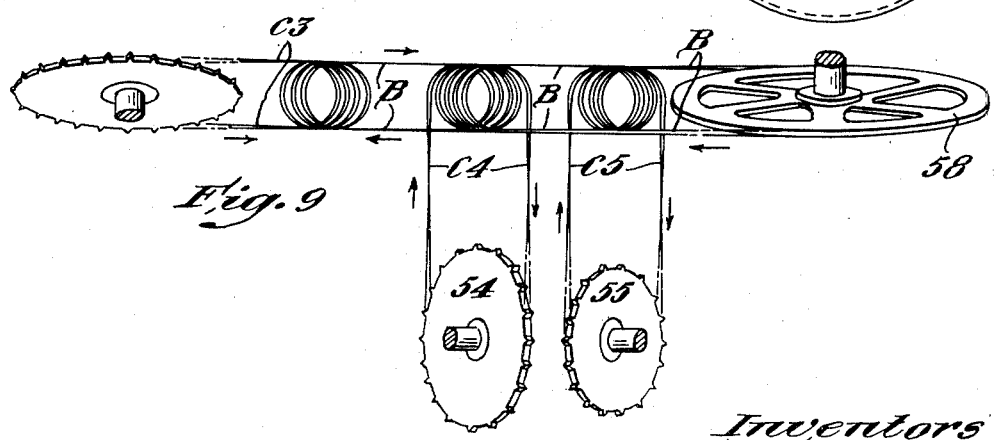
Fig. 9 is a diagrammatic side view of the three-path machine.

The modification shown in Figs. 8 and 9 comprises three spiral guides 43, 44 and 45 having their axes disposed in the same plane but inclined in relation to each other so that the belt B feeds from one guide to the next succeeding guide without twisting. Associated with the three spiral guides 43, 44 and 45 are three carriers C3, C4 and C5 which are driven by sprocket wheels 53, 54 and 55. The belt B is guided from the exit end of spiral guide 45 to the entrant end of spiral guide 43 over a roller 58 corresponding to 8 of Fig. 1 and 38 of Figs. 6 and 7. The carrier C3 feeds to and from the guide 43 from the side opposite to that in which the belt B feeds to and from the guide, whereas the sprocket wheels 54 and 55 are disposed below the guides 44 and 45 in planes approximately perpendicular to the plane of the belt wheel 58. In this connection it is noted that in each of the various embodiments of the invention the sprocket wheels for the carriers may be located at any desired location about the axis of the corresponding spiral guides so long as they do not interfere with the belt B.

In Figs. 8 and 9 the belt B is twisted only in passing to and from the wheel 58, not in passing from each spiral guide to the next succeeding guide. Here again the films may be fed to the belt at any desired location along the orbital path of the belt. However when one pair of films traverses all three helical paths the films are preferably fed to the belt as the belt passes from wheel 58 to guide 43 and from the belt as it passes from guide 45 to wheel 58. In three-color photography three pairs of film representing the three color aspects may be fed through the machine concomitantly, each pair being fed to the belt just before it enters one of the spirals and from the belt just after it leaves the spiral.

Figure 10:
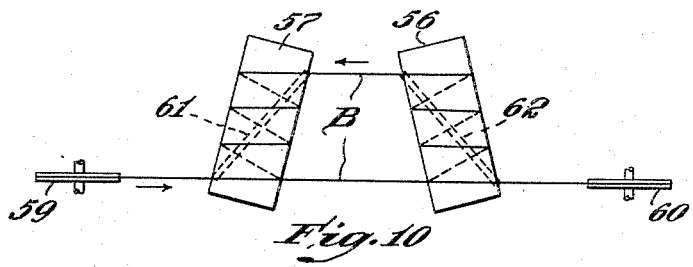
Fig. 10 is a diagrammatic plan view of another modification having two spiral paths.
Figure 11:
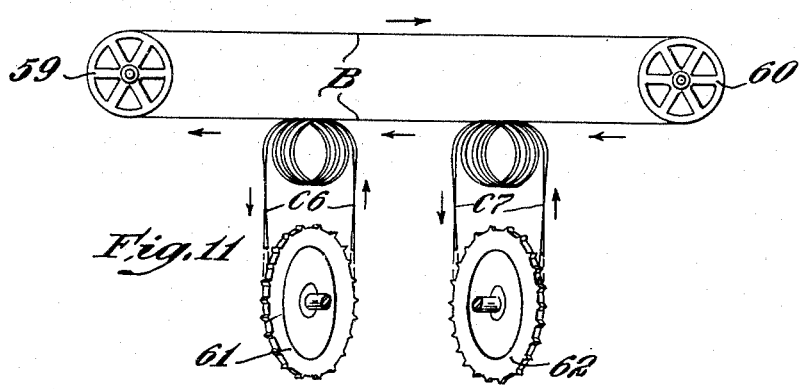
Fig. 11 is a diagrammatic side view of the same machine.

The modification shown in Figs. 10 and 11 is like that shown in Figs. 6 and 7 in that it comprises two spiral guides 56 and 57 having their axes disposed in the same plane but inclined relatively to each other so that the belt feeds from 56 to 57 without twisting. However instead of returning the belt from one guide to the other over a single pulley, as in the preceding embodiments, it is returned through a longer path around two pulleys 59 and 60 whose axes are disposed in a plane parallel to the plane containing the axes of the spiral guides. In this way the belt can be returned without twisting. Thus the belt is not subjected to any twisting throughout its entire orbit. Here the vertical plane of the wheels 59 and 60 is perpendicular to the plane containing the axes of the two spirals and these axes are inclined to the vertical plane of the wheels equally and in opposite directions. This modification also differs from that of Figs. 6 and 7 in that the sprocket wheels 61 and 62 for the two carriers C6 and C7 are disposed below the spiral guides rather than at the sides of the guides opposite to the sides where the wheels 59 and 60 are located. Here again either one pair or two pairs of films may be fed to the machine and they may be fed to and from the belt in any of the straight stretches of the belt.

Figure 12:
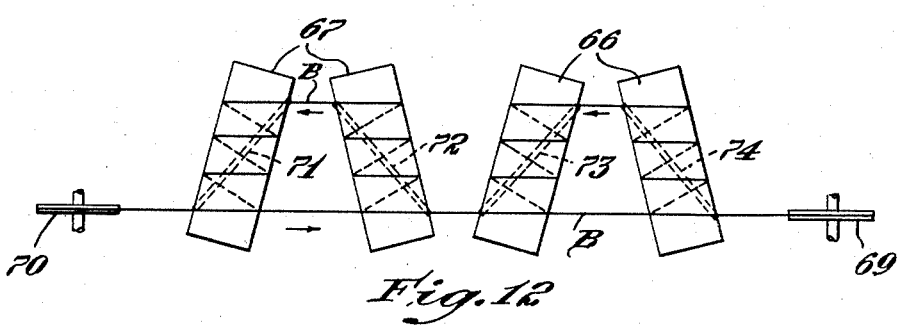
Fig. 12 is a diagrammatic plan view of a machine like that shown in Figs. 10 and 11 except in that it has two pairs of spiral paths instead of one pair.

The modification shown in Fig. 12 is identical with that shown in Figs. 10 and 11 except in that it has two pairs of spiral guides 66 and 67 instead of one pair. Thus the belt has one long stretch in passing from wheel 70 to wheel 69 and in passing from wheel 69 to wheel 70 it has five short stretches instead of the three short stretches of Figs. 10 and 11. As in the preceding embodiment the sprocket wheels 71, 72, 73 and 74 are disposed below the spirals respectively.

It should be understood that the present disclosure is for the purpose of illustration only and that this invention includes all modifications and equivalents which fall within the scope of the appended claims. For example in each embodiment of the invention the films may be fed to the belt after it enters a spiral path and from the belt before it leaves the spiral path.

We claim:

1. Cinematographic apparatus comprising an endless flexible carrier, stationary guide means for guiding the carrier along an approximately spiral path so that the carrier is not subjected to substantial flexing back-and-forth while traversing the path, means for feeding the carrier along an orbital path which includes said spiral path and a return path which leaves the spiral path tangentially at one end and joins it tangentially at the other end, and a wheel to guide the carrier in said return path, the wheel being tipped with respect to the axis of the spiral path so that points, which are disposed on opposite sides of the wheel in the same plane perpendicular to the axis of the wheel, are in tangential alignment with the spiral path at opposite ends thereof, so that the return path of the carrier involves only a partial turn around the wheel.

2. Cinematographic apparatus comprising an endless flexible film carrier, stationary guide means for guiding the carrier along an approximately spiral path so that the carrier is not subjected to substantial flexing back-and-forth while traversing the path, means for feeding the carrier along an orbital path which includes said spiral path and a return path which leaves the spiral path tangentially at the exit end of the spiral path and joins it tangentially at its entrant end, and an endless pin-belt having pins fitting film sprocket holes, the pin belt traveling in a closed path which includes said spiral path, the pin-belt feeding over said carrier near said entrant end leaving the carrier near said exit end.

3. Cinematographic apparatus comprising an endless flexible film carrier, stationary guide means for guiding the carrier along an approximately spiral path so that the carrier is not subjected to substantial flexing back-and-forth while traversing the path, means for feeding the carrier along an orbital path which includes said spiral path and a return path which leaves the spiral path tangentially at the exit end of the spiral path and joins it tangentially at its entrant end, an endless pin-belt having pins fitting film sprocket holes, the pin-belt traveling in a closed path which includes said spiral path and a return path, the pin-belt feeding over said carrier at a location near said entrant end leaving the carrier at a location near said exit end, and a wheel which is inclined to the axis of the guide means determining the spiral path and has its opposite sides tangentially aligned with the spiral path at said locations respectively to guide the pin-belt in its return path.

4. Cinematographic apparatus comprising an endless flexible film carrier, stationary guide means for guiding the carrier along an approximately spiral path so that the carrier is not subjected to substantial flexing back-and-forth while traversing the path, means for feeding the carrier along an orbital path which includes said spiral path and a return path which leaves the spiral path tangentially at one end of the spiral path and joins it tangentially at the other end, a wheel which is inclined to the axis of the spiral path on one side thereof and has its opposite sides tangentially aligned with the spiral path at opposite ends thereof to guide the carrier in its return path, an endless pin-belt having pins fitting film sprocket holes, the pin-belt traveling in a closed path which includes said spiral path and a return path, the pin-belt feeding over said carrier at a location near said entrant end leaving the carrier at a location near said exit end, and a wheel which is inclined to the axis of the guide means determining the spiral path on another side thereof and has its opposite sides tangentially aligned with the spiral path at said locations respectively to guide the pin-belt in its return path.

5. Cinematographic apparatus comprising an endless belt, and means for guiding the belt along an orbital path including a plurality of curved portions and also a plurality of succeeding spiral portions disposed side by side so that the progression of the belt lengthwise of the spiral axes is in opposite directions in adjacent spiral portions respectively, said axes being disposed approximately in the same plane but being inclined to each other in that plane so that the ends of the spiral portions where the belt crosses from one spiral portion to the succeeding spiral portion are in tangential alignment, said curved portions also being in tangential alignment with ends of the spiral portions and the axes of the curved portions being approximately parallel to said plane, whereby the belt may feed from each of said portions to the next succeeding portion without substantial twisting.

6. Cinematographic apparatus comprising an endless belt, and means for guiding the belt along an orbital path including a plurality of curved portions and also a plurality of pairs of spiral portions disposed side by side in a row so that the progression of the belt lengthwise of the spiral axes is in approximately opposite directions in each two succeeding spiral portions respectively, said axes being disposed approximately in the same plane but being inclined to each other in that plane so that the ends of the spiral portions where the belt crosses from one spiral portion to the succeeding spiral portion are in tangential alignment, alternate axes being inclined in opposite directions lengthwise of said row, said curved portions also being in tangential alignment with ends of the spiral portions and the axes of the curved portions being approximately parallel to said plane, whereby the belt may feed from each of said portions to the next succeeding portion without substantial twisting.

7. Cinematographic apparatus comprising an endless belt, and means for guiding the belt along an orbital path, said means including two wheels in the same plane and a plurality of spiral guideways intermediate the two wheels, the axes of the spiral guideways being disposed approximately in a plane perpendicular to said plane and parallel to the axes of said wheels, the axes of the spiral guideways being inclined to the plane of the wheels equally and alternately in opposite directions so that the ends of said spiral portions align tangentially with each other and with said wheels respectively, whereby the belt may feed between the curved portions of said path without substantial twisting.

8. Cinematographic apparatus comprising an endless belt, and means for guiding the belt along an orbital path, said means including two wheels in the same plane and a plurality of pairs of spiral guideways intermediate the two wheels, the axes of the spiral guideways being disposed approximately in a plane perpendicular to said plane and parallel to the axes of said wheels, the axes of the spiral guideways being inclined to the plane of the wheels equally and alternately in opposite directions so that the ends of said spiral portions align tangentially with each other and with said wheels respectively, whereby the belt may feed between the curved portions of said path without substantial twisting.

LAURISTON E. CLARK.
JOHN M. ANDREAS.

REFERENCES CITED

The following references are of record in the file of this patent:

UNITED STATES PATENTS

| Number | Name | Date |
| --- | --- | --- |
| 1,473,542 | Chanier et al. | Nov. 6, 1923 |
| 1,711,356 | Lewis et al. | Apr. 30, 1929 |
| 2,328,492 | Rackett | Aug. 31, 1943 |
| 2,353,219 | Capstaff | July 11, 1944 |